(12) United States Patent
Albrecht et al.

(10) Patent No.: US 7,713,591 B2
(45) Date of Patent: May 11, 2010

(54) LONGITUDINAL PATTERNED MEDIA WITH CIRCUMFERENTIAL ANISOTROPY FOR ULTRA-HIGH DENSITY MAGNETIC RECORDING

(75) Inventors: Manfred Albrecht, Isny-Rohrdorf (DE); Andreas Moser, San Jose, CA (US); Natacha Supper, Campbell, CA (US); Bruce Terris, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1128 days.

(21) Appl. No.: 11/209,275

(22) Filed: Aug. 22, 2005

(65) Prior Publication Data

US 2007/0042229 A1    Feb. 22, 2007

(51) Int. Cl.
C23C 14/48 (2006.01)
C23C 14/58 (2006.01)
C23C 14/14 (2006.01)
B05D 5/00 (2006.01)
B05D 3/06 (2006.01)

(52) U.S. Cl. .......... 427/528; 427/531; 427/526; 427/130

(58) Field of Classification Search ............ 427/523
See application file for complete search history.

(56) References Cited

U.S. PATENT DOCUMENTS

| | | | | |
|---|---|---|---|---|
| 3,320,597 A * | 5/1967 | Hart | .................. | 365/171 |
| 5,851,643 A * | 12/1998 | Honda et al. | .................. | 428/212 |
| 5,989,674 A * | 11/1999 | Marinero et al. | ......... | 428/836.3 |
| 6,280,813 B1 | 8/2001 | Carey et al. | .................. | 428/65.3 |
| 6,383,597 B1 * | 5/2002 | Fullerton et al. | ......... | 428/836.1 |
| 6,391,430 B1 | 5/2002 | Fullerton et al. | ............ | 428/212 |
| 6,602,612 B2 | 8/2003 | Abarra et al. | .............. | 428/611 |
| 6,670,057 B2 | 12/2003 | Inomata | .................. | 428/694 |
| 6,723,450 B2 | 4/2004 | Do et al. | .................. | 428/611 |
| 6,761,982 B2 | 7/2004 | Sakawaki et al. | .......... | 428/694 |
| 6,770,386 B1 | 8/2004 | Hara et al. | .................. | 428/694 |
| 6,777,112 B1 | 8/2004 | Girt et al. | .................. | 428/694 |
| 6,794,057 B2 | 9/2004 | Wang et al. | ................ | 428/611 |
| 6,849,349 B2 * | 2/2005 | Klemmer et al. | ............ | 428/826 |
| 6,865,044 B1 * | 3/2005 | Albrecht et al. | .............. | 360/59 |
| 6,882,488 B1 * | 4/2005 | Albrecht et al. | .............. | 360/55 |
| 7,425,353 B2 * | 9/2008 | Albrecht et al. | ............ | 427/523 |
| 2003/0049461 A1 | 3/2003 | Inomata | .................... | 428/428 |

(Continued)

OTHER PUBLICATIONS

Chappert et al., "Planner Patterned Magnetic Media Obtained by Ion Irradiation", Science, vol. 280, Jun. 19, 1989, pp. 1919-1922.*

(Continued)

*Primary Examiner*—Marianne L Padgett
(74) *Attorney, Agent, or Firm*—Kunzler Needham Massey & Thorpe (57) ABSTRACT

An apparatus and method is disclosed for orienting the magnetic anisotropy of longitudinal patterned magnetic recording media. A disk-shaped longitudinal granular magnetic recording medium is provided having a high orientation ratio in the circumferential direction. The medium is then patterned to form a uniform array of magnetic islands. The magnetic islands are then irradiated with ions to increase the magnetic exchange coupling between the grains of each island. This aligns the axes of magnetic anisotropy of the individual grains with the average axis of magnetic anisotropy of the grains, thereby aligning the magnetic anisotropy of each island along the circumferential direction.

15 Claims, 5 Drawing Sheets

U.S. PATENT DOCUMENTS

| | | | | |
|---|---|---|---|---|
| 2003/0108774 | A1 | 6/2003 | Kawai et al. | 428/694 |
| 2004/0157086 | A1* | 8/2004 | Hwang et al. | 428/693 |
| 2004/0219394 | A1 | 11/2004 | Kawai et al. | 428/694 |
| 2005/0067272 | A1* | 3/2005 | Pelhos | 204/192.12 |
| 2005/0170212 | A1* | 8/2005 | Albrecht et al. | 428/694 T |
| 2005/0181239 | A1* | 8/2005 | Ma et al. | 428/835 |

OTHER PUBLICATIONS

Kleiber et al., "Magnetization Switching of Sub micrometer Co Dots Induced by a Magnetic Force Microscope Tip", Physical Review Be, vol. 58, #9, Sep. 1, 1998, pp. 5563-5567.*

Fassbender, et al., "Tailoring magnetism by light-ion irradiation", Published Jul. 28, 2004, pp. R179-R196, online at stacks.iop.org/JPhysD/37/R179.

Rettner, et al., "Characterization of the magnetic modification of Co/Pt multilayer films by He+, Ar +, and Ga+ ion irradiation", vol. 80, No. 2, Jan. 14, 2002; p. 279-281.

Wang J P, et al., "Laminated Antiferromagnetically Coupled media for 100 Gb/in2 Areal density and beyond", 2001 vol. 101, No. 399 (MR2001 38-53), p. 61-66, Fig. 9, Ref. 16, Journal No. S0532BBG, English abstract.

W. W. Jiang, et al., "[CoAl/Pd]n Multilayers as perpendicular recording media", Journal of Applied Physics, vol. 91, No. 10; May 15, 2002, p. 8067-8069.

C. H. Hee, et al., "Effect of competing energies on the transition noise of oriented magnetic media", Appl. Phys Lett., vol. 81, No. 11; Sep. 9, 2002 p. 2038-2040.

Wang J P, et al., "Design of Laminated Antiferromagnetically Coupled media for beyond 100 Gb/in2 Areal density", Journal of Applied Physics, vol. 91, No. 10; May 15, 2002 p. 7694-7696.

X. Brian, et al., "Oriented Longitudinal Media on Glass Substrates", IEEE Transactions on Magnetics, vol. 39, No. 5, Sep. 2003; p. 2252-2257.

"Magnetic Anisotropy" http://www.irm.umn.edu/hg2m/hg2m_c/hg2m_c.html.

* cited by examiner

LONGITUDINAL PATTERNED MEDIA WITH CIRCUMFERENTIAL ANISOTROPY FOR ULTRA-HIGH DENSITY MAGNETIC RECORDING

BACKGROUND OF THE INVENTION

1. Field of the Invention

This invention relates to hard-disk data storage using longitudinal patterned recording media and more particularly to apparatus and methods for orienting magnetic anisotropy in longitudinal patterned recording media.

2. Description of the Related Art

Conventional longitudinal magnetic recording media generally comprises granular magnetic layers formed by sputtering Co-alloys onto a suitable aluminum alloy or glass substrate. The magnetization of conventional longitudinal media is typically in the plane of the disk. Data is written onto the media by applying a localized magnetic field using a recording head that glides over the surface of the media.

The areal density of conventional magnetic storage media has been increasing at more than one hundred percent annually. This increase has typically been achieved by reducing the dimensions of the magnetic grains while continuing to store information on a conventional granular magnetic medium using in-plane magnetization. However, estimates show that thermal energy starts to compete with the anisotropy energy per grain if grain volumes are continually reduced. If the volume of the grains is reduced too much, the magnetization of the grains becomes unstable and the grain magnetization may flip spontaneously, thereby erasing the data stored thereon. This effect is known as the superparamagnetic effect. To avoid the superparamagnetic effect, the product of the grain volume (V) and the anisotropy energy (Ku) must be maintained above a specified value to keep the individual grains stable.

Since the grain volume (V) must be reduced to provide higher recording densities, one method for maintaining the thermal stability of the magnetic grains is to increase Ku. However, a Ku that is too high results in a media coercivity that is too high. That is, although the magnetic grains would be thermally stable, it would be impossible to write data onto the media because it would require a magnetic field stronger than can be supplied by currently available write heads.

To avoid the limits of the superparamagnetic effect, one possible solution is the use of patterned media. In patterned media, tracks of discrete magnetic islands are formed in a circumferential direction around the media surface. Each island stores a single bit and functions as a single-domain switching volume. Each island may comprise a single magnetic grain or several exchange-coupled grains. Because the size of an island typically exceeds the grain size used in conventional longitudinal recording media, the magnetic switching or grain volume (V) is typically large enough to maintain the thermal stability of each island.

Most studies of patterned media have focused on perpendicular recording applications where the magnetic anisotropy of the media is perpendicular to the substrate. Such a transition to perpendicular recording media, however, would require a transition to perpendicular recording technology, including perpendicular recording heads, perpendicular media read channels, and the like. Thus, to take advantage of longitudinal recording technology, it may be advantageous to develop patterned media for longitudinal applications.

One challenge to implementing longitudinal patterned media is orienting the magnetic anisotropy of the individual islands. When the magnetic grains are grown or deposited on an isotropic media substrate, the magnetic anisotropy (i.e., easy axis) of each grain is randomly oriented in the plane of the substrate. As a result, the magnetic anisotropy of each island is also oriented randomly in the plane of the substrate. This can decrease the signal-to-noise ratio when reading from the islands since the magnetization of the islands is typically measured along the track. If the axis of magnetic anisotropy of an island is oriented perpendicular to the track, a read head will detect little or no signal from the island. Likewise, if the axis of magnetic anisotropy is oriented at forty-five degrees with respect to the track, the signal in the read head will be reduced.

Accordingly, apparatus and methods are needed for orienting the magnetic anisotropy of islands in longitudinal patterned recording media. More particularly, apparatus and methods are needed for orienting the magnetic anisotropy of islands in a circumferential direction around the longitudinal patterned media. Such apparatus and methods are disclosed herein.

SUMMARY OF THE INVENTION

The present invention has been developed in response to the present state of the art, and in particular, in response to the problems and needs in the art that have not yet been fully solved by currently available apparatus and methods. Accordingly, the present invention has been developed to provide apparatus and methods for orienting the magnetic anisotropy of longitudinal patterned magnetic recording media that overcome many or all of the above-discussed shortcomings in the art.

In certain embodiments, a method for orienting the magnetic anisotropy of longitudinal patterned magnetic recording media includes providing a disk-shaped granular magnetic recording medium for longitudinal recording. Each of the magnetic grains of the medium is characterized by an axis of magnetic anisotropy, the average of which is substantially oriented along a circumferential direction of the recording medium. The method further includes patterning the recording medium to form a uniform array of magnetic islands, each island comprising several magnetic grains. The method further includes irradiating the magnetic islands with ions to increase an existing magnetic exchange coupling or create a magnetic exchange coupling between the grains of each island. This exchange coupling aligns the axes of magnetic anisotropy of the individual grains with the average axis of magnetic anisotropy of the grains.

In certain embodiments, prior to irradiation, the axis of magnetic anisotropy of each magnetic grain lies in a plane parallel to the surface of the magnetic recording medium. The axes of magnetic anisotropy of these grains may be highly oriented in a circumferential direction along the recording medium. After irradiation, the magnetic exchange coupling causes the grains within each magnetic island to act as a single-domain switching volume, suitable for representing a data bit. The magnetic exchange coupling increases the signal-to-noise ratio when reading from the magnetic islands.

In selected embodiments, the magnetic exchange coupling is optimized by varying the ion type, the ion exposure time, and the ion energy. Suitable ion types may include, for example, argon, gallium, hydrogen, helium, xenon, krypton, neon, mercury, and indium ions. Likewise, in certain embodiments, the ionic exposure may be between about 0.0001 and about 0.0200 nC/$\mu$m$^2$.

In another embodiment in accordance with the invention, a recording device may include a longitudinal magnetic recording medium having a disk-shaped medium substrate and a patterned array of magnetic islands arranged in a circumferential direction around the medium substrate. Each island may include multiple exchange-coupled magnetic grains having a magnetic axis of magnetic anisotropy substantially in the circumferential direction. This exchange coupling may be built up or produced by exposing the grains to a dose of ion irradiation. If no exchange coupling exists, an exchange coupling is created. If an exchange coupling does exist, this coupling is built up or intensified. The recording device may also include a recording head for writing magnetic fields to, and reading magnetic fields from, the recording medium.

In another embodiment in accordance with the invention, a method for orienting the magnetic anisotropy of longitudinal patterned magnetic recording media includes providing a medium substrate and patterning the medium substrate to include multiple magnetic islands. Each magnetic island may include several magnetic grains, each having an individual axis of magnetic anisotropy. Each magnetic island may also be characterized by an average axis of magnetic anisotropy comprising the average of the individual axes of magnetic anisotropy. The method further includes irradiating the magnetic islands with a predetermined type of ion, ion exposure time, and ion energy. This creates magnetic exchange coupling between the magnetic grains of each island, causing the individual axes of magnetic anisotropy to substantially align with the average axis of magnetic anisotropy.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are disclosed to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

For the purpose of this description, the phrase "axis of magnetic anisotropy," unless otherwise noted, is used to mean the magnetic easy axis of a particular magnetic volume.

Figure 1:
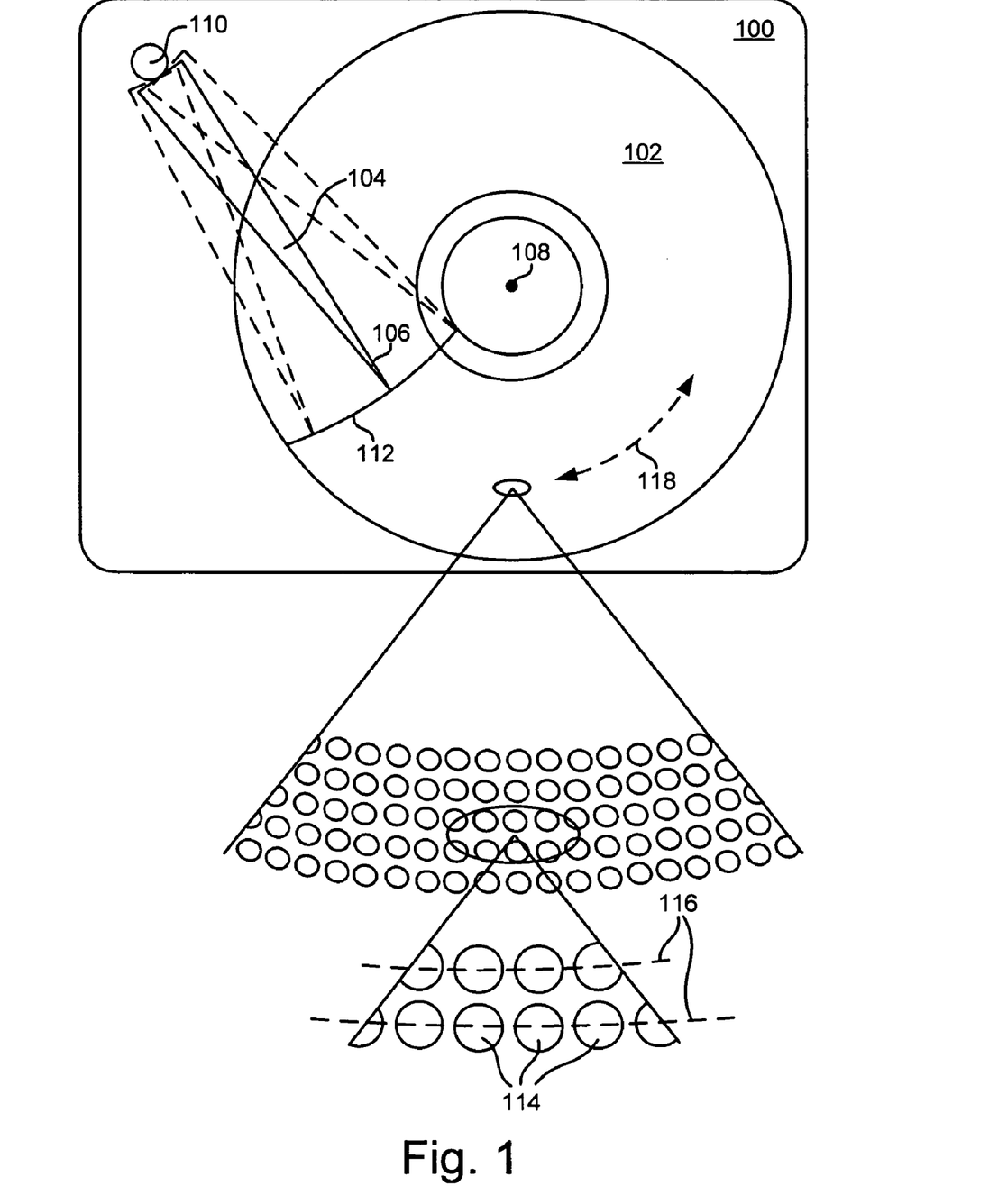
FIG. 1 is schematic block diagram of one embodiment of a recording device comprising a recording head and a longitudinal patterned magnetic recording medium.

Referring to FIG. 1, in certain embodiments, a recording device 100 in accordance with the invention may include a longitudinal magnetic recording medium 102 and an arm 104 supporting a recording head 106 for writing to, and reading from, the medium 102. The medium 102 may, for example, comprise various granular magnetic layers deposited on a suitable aluminum or glass substrate. These granular layers may comprise Co-alloys which may be deposited by sputtering to form a magnetic recording layer on the medium 102. The longitudinal recording medium 102 may be disk-shaped and may rotate about a central axis 108. The arm 104 may pivot with respect to a pivot point 110 to enable translation of the recording head 106 from the outer edge of the recording medium 102 toward the central axis 108 over a generally arcuate path 112. The recording head 106 may write data to the medium 102 by applying a localized magnetic field as it flies over the surface of the rotating disk 102. The magnetization of the medium 102 is oriented within the plane of the disk 102.

In order to avoid the density limitations imposed by the superparamagnetic effect in conventional longitudinal recording media, the magnetic layer of the recording medium 102 may be patterned. Those of skill in the art will readily recognize a variety of techniques that may be used to pattern the media including sputtering, wet-etching, dry-etching, ion-beam lithography, stamping, and the like. This patterning process may form an array of highly uniform islands 114. Each island 114 may comprise one or more magnetic grains forming a single-domain switching volume suitable for storing a single data bit. The islands 114 may be arranged into circular tracks 116 in a circumferential direction 118 around the disk-shaped recording medium 102.

Because a recording head 106 typically measures magnetization along the track 116 in the circumferential direction 118, the axis of magnetic anisotropy of the magnetic islands 114 is preferably oriented along the circumferential direction 118. This improves the signal-to-noise ratio when reading from the islands 114 and may allow higher areal densities. Nevertheless, in the past, the inability to perfectly orient the axis of magnetic anisotropy within each island 114 along the circumferential direction 118 has hindered the implementation of longitudinal patterned recording media.

Figure 2:
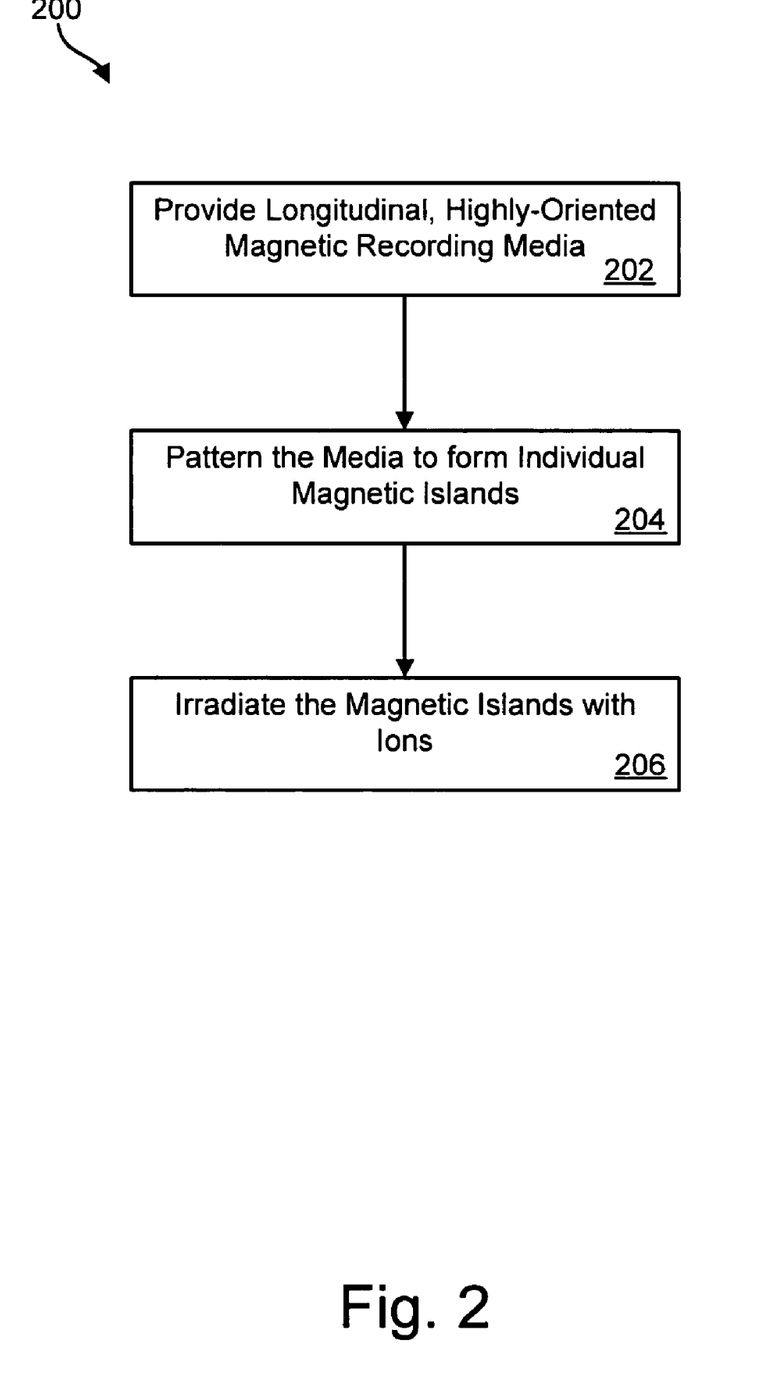
FIG. 2 is a flow chart diagram of one embodiment of a method for orienting the magnetic anisotropy of longitudinal patterned recording media.

Referring to FIG. 2, in one embodiment, a method 200 for orienting the magnetic anisotropy of the individual islands 114 along the circumferential direction 118 includes providing 202 longitudinal magnetic recording media 102 having a high orientation ratio. The orientation ratio (OR) is typically defined as the ratio of the remnant magnetization, coercivity, or other magnetic parameters measured along the circumferential, or down track, direction 118 to that along the radial, or cross track, direction. For the purposes of this description, high OR media is any media having an OR greater than one.

High OR media may be produced, for example, by mechanically polishing sputtered media 102 in a circumferential direction 118, thereby producing a circumferential texture on the media 102. These textures induce the OR of the media 102. Similarly, circumferential polishing using more advanced polish slurries may provide finer textures, thereby allowing higher densities and decreased surface roughness to reduce recording head flying heights. Despite significant progress that has been achieved in increasing the OR of the media 102 in the circumferential direction 118, the magnetic anisotropy of the individual grains may still not precisely align with the circumferential direction 118.

After providing 202 high OR media, the method 200 may include patterning the media 102 to provide a uniform array of magnetic islands 114. The pattern may be created using any known or forthcoming process, including ion-beam lithography, stamping, or other process. For example, a stamping process may include stamping a polymer film with an electron-beam written master. This polymer film may then serve as an etch mask to etch the magnetic layer or a substrate of the magnetic layer of the recording media, thereby forming the pattern. Similarly, ion-beam lithography may use an ion beam to alter the magnetic properties of a magnetic layer through a resist mask or an open stencil mask, thereby producing patterned magnetic regions on the media 104. Thus, any known or forthcoming process may be used to satisfy the patterning step 204.

After patterning 204 the media 102, the method 200 may include lightly irradiating 206 the media 102 with ions to induce, create, or strengthen a magnetic exchange coupling between the magnetic grains of each island 114. Suitable ions may include, for example, argon, gallium, hydrogen, helium, xenon, krypton, neon, mercury, and indium ions. As will be apparent in the discussion relating to FIGS. 4A though 4B, the ion irradiation exposure is enough to create the magnetic exchange coupling needed to align the axes of magnetic anisotropy of the individual grains, but not so much that the magnetic properties of the material are destroyed or damaged. The optimal exposure time may depend, in part, on the type of ion used, the ion current, the ion energy, and the alloy composition of the grains.

As previously explained, prior to irradiation, the granular axes of magnetic anisotropy are highly oriented along the circumferential direction 118, although the alignment with respect to the circumferential direction 118 may vary. Nevertheless, the average axis of magnetic anisotropy for each island 114 preferably points more precisely along the circumferential direction 118 compared to the individual axes of magnetic anisotropy. After irradiation, the magnetic exchange coupling between the grains of each island 114 may cause the individual axes of magnetic anisotropy of each grain to align with the average axis of magnetic anisotropy of the island 114. Furthermore, the exchange coupling may cause the grains of each island 114 to behave as a single-domain switching volume, having an axis of magnetic anisotropy aligned with the circumferential direction 118. Not only does the exchange coupling reduce the media 102 noise (by aligning the axes of magnetic anisotropy of the grains), the circumferential anisotropy reduces the switching field distribution (thereby increasing the media's ability to record a signal with sensitivity and precision, i.e. writeability improves) and increases the signal-to-noise ratio.

One advantage of the present invention is that an entire media disk 102 may be irradiated with ions simultaneously. Thus, the magnetic anisotropy of all or a large portion of the islands 114 may be oriented along the circumferential direction 118 in a single step. Furthermore, because the ion irradiation process is essentially an isotropic process where the ions scatter randomly in all directions upon contacting the media 102, the ions may be directed onto the media 102 surface at virtually any angle, including perpendicularly, to build the magnetic exchange coupling between grains of each island 114, either by producing an exchange coupling or intensifying an existing exchange coupling.

Figure 3A:
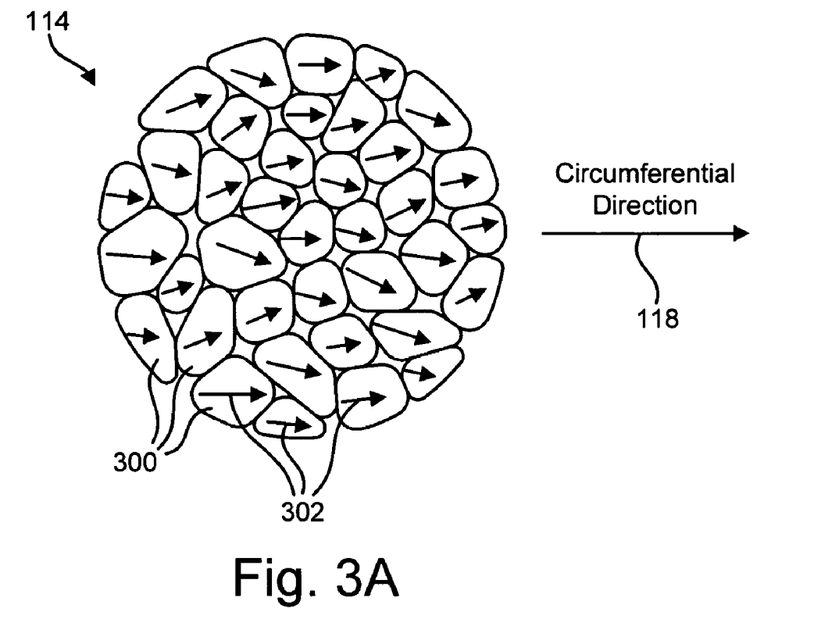
FIG. 3A is block diagram of one embodiment of a magnetic island comprising magnetic grains highly oriented along a circumferential direction of the recording media.

Referring to FIG. 3A, after patterning the media 102 but prior to irradiating the media 102 with ions, each island 114 may include several grains 300, each having an axis of magnetic anisotropy 302 that, although highly oriented in the circumferential direction 118, may not be precisely aligned with the circumferential direction 118. Because they are highly oriented, however, the average axis of magnetic anisotropy may be substantially oriented along the circumferential direction 118.

Figure 3B:
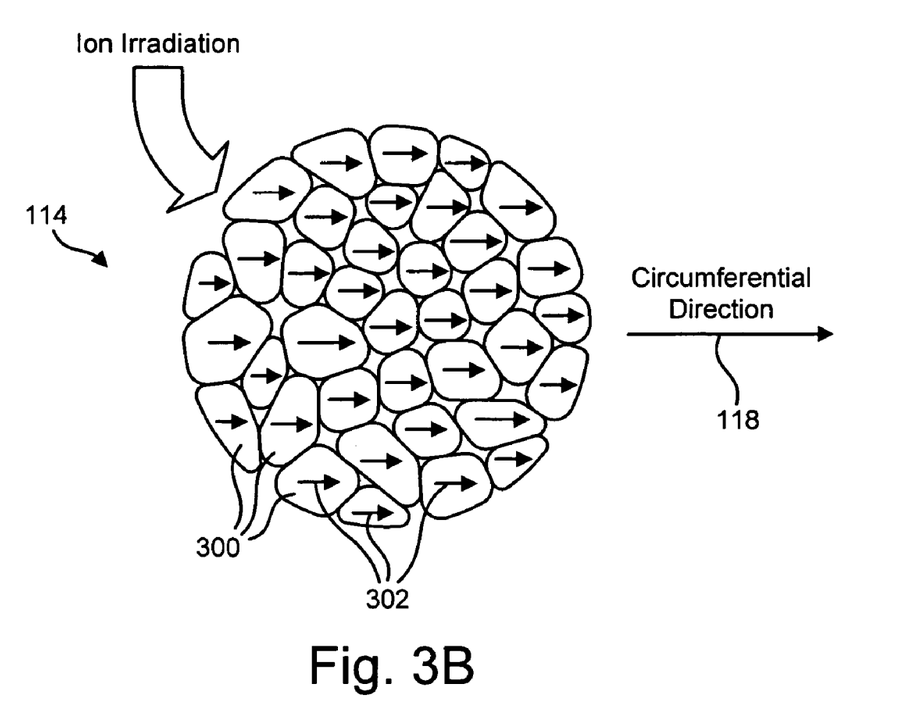
FIG. 3B is block diagram of one embodiment of the magnetic island of FIG. 3A after ion irradiation exposure.

Referring to FIG. 3B, after ion irradiation, the intergranular magnetic exchange coupling increases to a point where the individual axes of magnetic anisotropy 302 align with the average axis of magnetic anisotropy. In embodiments where the magnetic grains 300 comprise Co and Co-alloys, it is believed that the ion irradiation moves cobalt atoms, a highly magnetic element located within the grains, closer to the grain boundaries, which may be comprised of lesser magnetic cobalt-chromium. These cobalt atoms may create or increase the magnetic exchange coupling between the grains 300. Because the average axis of magnetic anisotropy is aligned with the circumferential direction 118, this causes the axes of magnetic anisotropy 302 of the individual grains 300 to align with the circumferential direction 118. Depending on the degree or amount of exchange coupling, this may cause all of the grains 300 to behave as a single-domain switching volume. Furthermore, the magnetic anisotropy of the island 114 may predominate over any shape anisotropy that the island 114 may have. Thus, the island 114 may act as a single magnetic switching volume, or single domain, having an axis of magnetic anisotropy aligned with the circumferential direction 118.

Figure 4A:
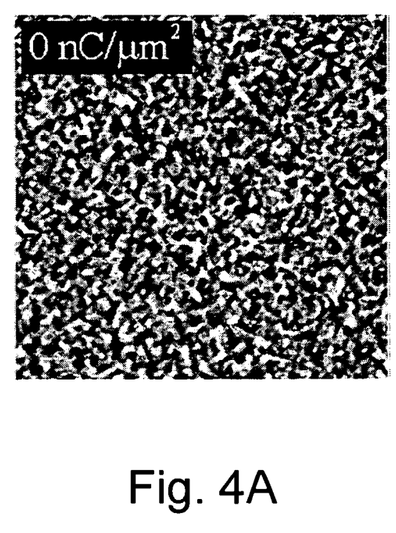
FIGS. 4A through 4D are several magnetic force microscope images showing the effects of ion irradiation on the magnetic domains as a function of exposure time.
Figure 4B:
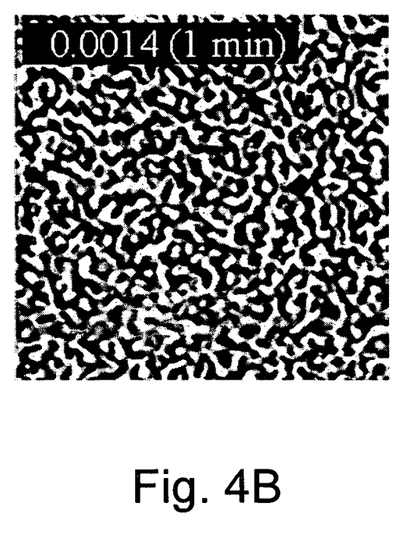
Figure 4C:
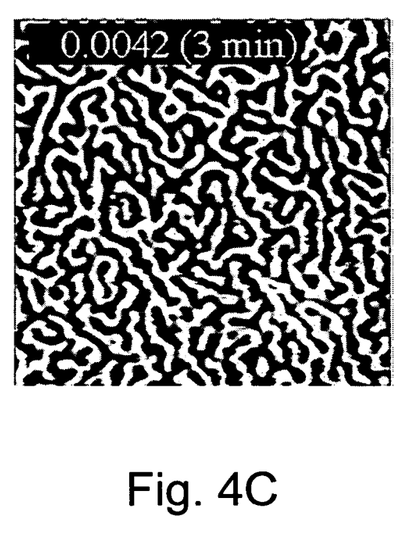
Figure 4D:
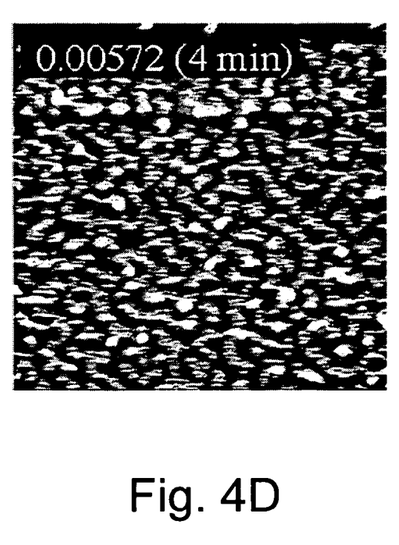

Referring to FIGS. 4A through 4B, some insight into the effects of ion irradiation may be observed by examining changes to the magnetic domain structure under high-magnification. These Figures show the changing granular domain structure as a function of exposure time at a constant ion exposure rate. As shown by FIG. 4A, prior to ion irradiation, the domain sizes appear small and separated. As shown by FIG. 4B, after about one minute of ion irradiation creating an exposure of approximately 0.0014 nanoCoulombs per square micrometer (nC/$\mu$m$^2$), the domain sizes increase significantly. As shown in FIG. 4C, the domain sizes increase even more as the exposure increases to 0.0042 nC/$\mu$m$^2$ after about three minutes. Finally, as shown by FIG. 4D, damage or destruction to the domains and magnetic properties of the magnetic material may occur or have begun to occur at approximately 0.00572 nC/$\mu$m$^2$. These Figures show a preferred range of ion exposure of between about 0.0001 nC/$\mu$m$^2$ and about 0.00572 nC/$\mu$m$^2$, and more preferably between about 0.0014 nC/$\mu$m$^2$ and about 0.0042 nC/$\mu$m$^2$. Of course in other embodiments, the exposure times and/or exposure rates may be varied as well.

Figure 5:
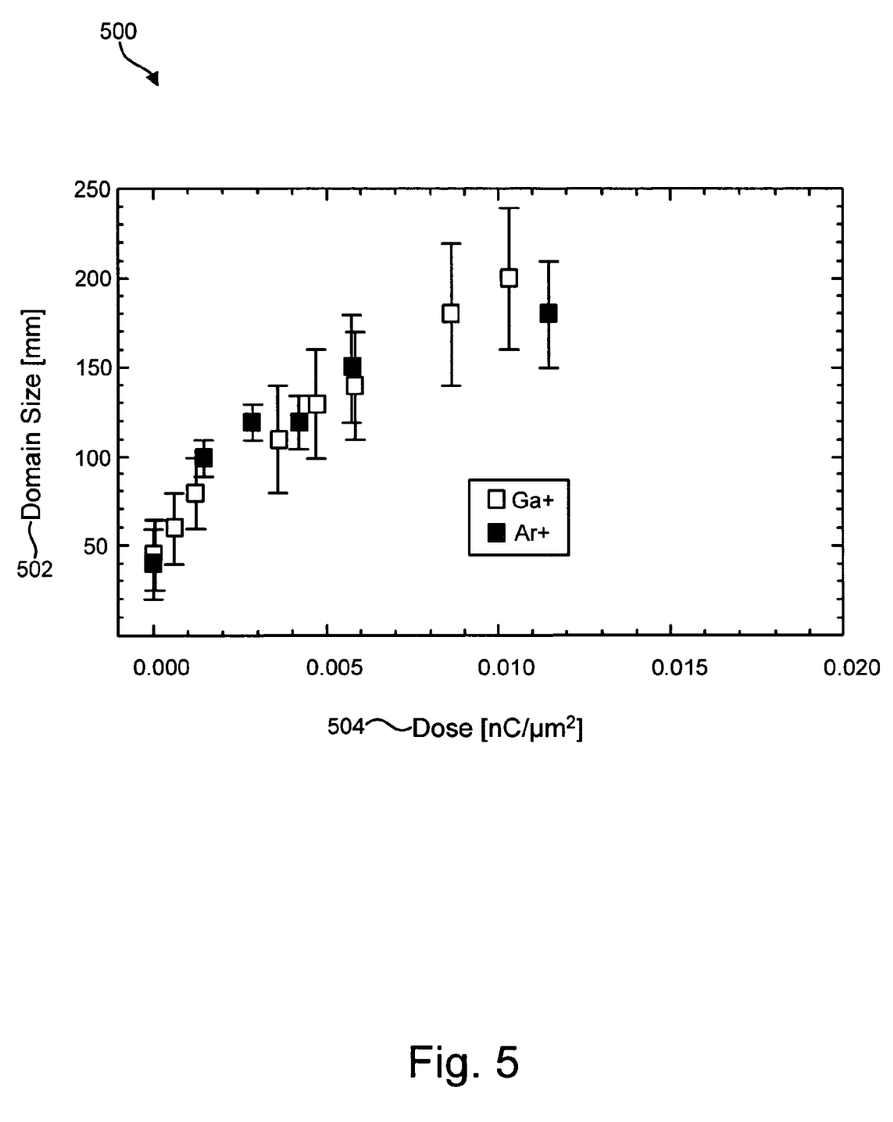
FIG. 5 is a graph showing the variation in the magnetic domain size as a function of the ion dose.

Referring to FIG. 5, as illustrated by the graph 500, the domain size 502 increases as the ion irradiation dose 504 increases. Here, for a dose of between 0.0001 nC/$\mu$m$^2$ and 0.010 nC/$\mu$m$^2$ of gallium or argon ions, the granular domain size increases from about 40 nanometers (nm) to about 200 nm. Because the optimal range of exposure may preferably be between about 0.0014 nC/$\mu$m$^2$ and about 0.0042 nC/$\mu$m$^2$ in certain embodiments, this corresponds to a domain size of between about 60 nm and 130 nm.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for orienting the magnetic anisotropy of longitudinal patterned magnetic recording media, the method comprising:
providing a disk-shaped longitudinal magnetic recording medium comprising a plurality of magnetic grains, each said magnetic grain comprising magnetic cobalt atoms, each said magnetic grain having an axis of magnetic anisotropy, wherein the axis of magnetic anisotropy of each said magnetic grain lies in a plane parallel to the disk-shaped longitudinal recording medium and wherein a ratio of said magnetic grains having a magnetic anisotropy oriented substantially along a circumferential direction of the longitudinal magnetic recording medium to said magnetic grains having a magnetic anisotropy oriented substantially along a radial direction is greater than one;
patterning the longitudinal magnetic recording medium to form an array of magnetic islands arranged into circular tracks in a circumferential direction disposed around the disk-shaped longitudinal magnetic recording medium, each magnetic island having a portion of the magnetic grains of the magnetic recording medium; and
irradiating an entire surface of the patterned disk-shaped longitudinal magnetic recording medium simultaneously with ions, the ion radiation increasing a magnetic exchange coupling between the portion of said magnetic grains of the each magnetic island relative to a magnetic exchange coupling between the portion of said magnetic grains of the each magnetic island prior to the ion radiation, the increased magnetic exchange coupling aligning the axes of magnetic anisotropy of each said magnetic grain within the each magnetic island with an average axis of magnetic anisotropy of the portion of said magnetic grains in the each magnetic island.

2. The method of claim 1, wherein the increased magnetic exchange coupling after ion radiation increases the thermal stability of the magnetic grains within the each magnetic island.

3. The method of claim 1, wherein the increased magnetic exchange coupling after ion radiation causes the each magnetic island to act as a single magnetic domain suitable for representing a data bit.

4. The method of claim 1, wherein the increased magnetic exchange coupling after ion radiation increases the signal-to-noise ratio when reading from the magnetic islands.

5. The method of claim 1, wherein the magnetic exchange coupling is optimized for aligning the axes of magnetic anisotropy of each said magnetic grain within the each magnetic island with the average axis of magnetic anisotropy of the portion of said magnetic grains in the each magnetic island by varying at least one of an ion type, an ion exposure time, an ion current, and an ion energy.

6. The method of claim 5, wherein the ion type is selected from a group consisting of argon, gallium, hydrogen, helium, xenon, krypton, neon, mercury, and indium ions.

7. The method of claim 5, wherein a total ion exposure is between about 0.0001 nC/$\mu m^2$ and about 0.0200 nC/$\mu m^2$.

8. The method of claim 1, wherein the magnetic islands have a shape anisotropy and wherein the each magnetic anisotropy of the magnetic islands overcomes shape anisotropy of the magnetic islands.

9. A method for orienting the magnetic anisotropy of longitudinal patterned magnetic recording media, the method comprising:
providing a longitudinal recording medium having a longitudinal magnetic recording layer comprising a plurality of magnetic grains, each said magnetic grain comprising magnetic cobalt atoms, each said magnetic grain having an axis of magnetic anisotropy, wherein the axis of magnetic anisotropy of each said magnetic grain lies in a plane parallel to the magnetic recording medium;
orienting the axis of magnetic anisotropy of each said magnetic grain such that a ratio of said magnetic grains having a magnetic anisotropy oriented substantially along a circumferential direction of the longitudinal magnetic recording medium to said magnetic grains having a magnetic anisotropy oriented substantially along a radial direction is greater than one;
patterning the longitudinal magnetic recording layer to form an array of magnetic islands arranged into circular tracks in a circumferential direction disposed around the longitudinal magnetic recording medium, each magnetic island having a portion of the magnetic grains of the magnetic recording layer; and
irradiating an entire surface of the magnetic recording layer simultaneously with a predetermined type of ion, for a predetermined ion exposure time, and a predetermined ion energy to increase a magnetic exchange coupling between the portion of said magnetic grains of the each magnetic island relative to a magnetic exchange coupling between the portion of the magnetic grains of the each magnetic island prior to the ion radiation, the increased magnetic exchange coupling causing the individual axes of magnetic anisotropy of each said magnetic grain within the each magnetic island to substantially align with the average axis of magnetic anisotropy of the portion of said magnetic grains in the each magnetic island.

10. The method of claim 9, wherein the recording medium substrate is disk-shaped.

11. The method of claim 10, wherein the individual axes of magnetic anisotropy are more highly oriented in a circumferential direction along the disk-shaped recording medium substrate subsequent to ion irradiation than the axes of magnetic anisotropy prior to ion irradiation.

12. The method of claim 9, wherein the increased magnetic exchange coupling after ion radiation causes each magnetic island to act as a single magnetic domain suitable for representing a data bit.

13. The method of claim 9, wherein the increased magnetic exchange coupling after ion radiation increases the signal-to-noise ratio when reading from the magnetic islands.

14. The method of claim 9, wherein the ion type is selected from a group consisting of argon, gallium, hydrogen, helium, xenon, krypton, neon, mercury, and indium ions.

15. The method of claim 9, wherein a total ion exposure is between about 0.0001 nC/$\mu m^2$ and about 0.0200 nC/$\mu m^2$.

* * * * *